United States Patent [19]

Chiba et al.

[11] Patent Number: 5,421,864
[45] Date of Patent: Jun. 6, 1995

[54] AGENT FOR FILLER SURFACE TREATMENT IN WATER

[75] Inventors: Naoki Chiba; Koichiro Sagawa; Takashi Zama, all of Kawasaki, Japan

[73] Assignee: Ajinomoto Co., Inc., Tokyo, Japan

[21] Appl. No.: 115,549

[22] Filed: Sep. 3, 1993

[30] Foreign Application Priority Data

Sep. 4, 1992 [JP] Japan ................................ 4-236941
Jun. 29, 1993 [JP] Japan ................................ 5-159297

[51] Int. Cl.$^6$ ............................ C08K 9/04; B22F 1/02
[52] U.S. Cl. .................................. 106/2; 106/287.17; 106/287.19; 428/403; 428/407; 525/15; 525/33
[58] Field of Search ............... 106/287.17, 287.19, 106/2; 428/403, 407; 525/15, 33

[56] References Cited

U.S. PATENT DOCUMENTS 3,374,100  3/1968  Goldstein ............................ 106/2
5,010,129  4/1991  Elias et al. ........................ 524/413

OTHER PUBLICATIONS

Database WPI, Derwent Publications, AN 92-083731, JP-A-4 025 568, Jan. 29, 1992.
Database WPI, Derwent Publications, AN 88-115478, JP-A-63 061 066, Mar. 17, 1988.
Patent Abstracts of Japan, vol. 16, No. 295 (C-957), Jun. 30, 1992, JP-A-04 078 433, Mar. 12, 1992.
Database WPI, Derwent Publications, AN 89-314763, JP-A-01 234 437, Sep. 19, 1989.

Primary Examiner—Mark L. Bell
Assistant Examiner—C. M. Bonner
Attorney, Agent, or Firm—Oblon, Spivak, McClelland, Maier, & Neustadt

[57] ABSTRACT

A surface modifying agent for surface treating a filler in water which comprises 100 parts by weight of a zirconate base or/and aluminate base coupling agent(s) whose unhydrolyzable side chains have a solubility parameter (x) of 6.5–12, and 3 to 30 parts by weight of a nonionic surface active agent blended therewith having an HLB value (y) of 2–30 and containing no protonic hydrogen(s) in its molecule, wherein x and y satisfy a relationship of $4x-24 \leq y \leq 4x-18$, as well as another surface modifying agent for the same purpose which comprises a mixture of 100 parts by weight of the above one or two coupling agents having a viscosity of 200 cps or more with 30–3000 parts by weight of a water-insoluble solvent, where the total mol fraction value (z) of the solubility parameters of the unhydrolyzable side chains of the coupling agent(s) and the solvent is 6.5–12, and 3 to 1000 parts by weight of the above nonionic surface active agent blended therewith, wherein z and y satisfy a relationship of $4z-24 \leq y \leq 4z-18$. The inventive surface modifying agents have an excellent preservation stability and can perform water repellent treatment of fillers such as calcium carbonate in water.

4 Claims, No Drawings

AGENT FOR FILLER SURFACE TREATMENT IN WATER

BACKGROUND OF THE INVENTION

1. Field of the Invention

This invention relates to a surface modifying agent which provides fillers when subjected to a surface modifying treatment with it with water-repellent property, processability in resin and the like.

2. Discussion of the Background

Titanate base coupling agents are commonly known as surface treating agents which provide fillers with water repellency, reduced oil adsorption, dispersibility in resin, processability and the like by regulating surface energy of inorganic fillers and the like. When it is necessary to improve dispersibility, processability and the like of fillers in an organic matrix such as a resin, an organic solvent or the like, such improvements may be obtained by selecting a coupling agent which is fit for the wettability of relevant organic matrix, and various coupling agents fit for to various organic matrices are available. For example, a titanate base coupling agent having side chains of low polarity is used for low polarity resins such as polyolefin, and a high polarity agent for high polarity resins such as polyamide.

On the other hand, methods of the surface treatment of fillers with coupling agents is roughly divided into two categories, namely a pretreatment one in which a filler is treated with a coupling agent in advance before mixed with an organic matrix, and an integral blend one in which a coupling agent is added when a filler is mixed with an organic matrix. Since the integral blend method is somewhat low in treating efficiency, its use is limited to the field of coating materials and the like. The pretreatment method is further divided into a dry method in which a filler and a coupling agent are directly mixed using a mixer or the like and a wet method in which both components are treated in a solvent and the solvent is removed later, and the wet method is, in turn, divided into an organic solvent method in which an organic solvent is used and a water treatment method in which the treatment is carried out in water. Of these, the dry method is most commonly used, but is slightly inferior in surface treatment effect to the wet method. This is considered to be due, probably, to the incomplete mixing of the coupling agent with the other component. In addition, the dry method is not suitable for the treatment of fragile fillers such as hollow fillers, needle fillers and the like, because a mixer having a large shear is used therein. The organic solvent method is reliable with regard to the surface treatment of fillers, but there is a tendency to avoid its use due to the recently increasing organic solvent regulation.

The water treatment method is free from such organic solvent regulation and can effect uniform treatment under mild mixing conditions, but water soluble coupling agents are rare and, as a matter of course, no water soluble agents which can cope with low polarity organic matrixes have been known. In order to solve such a problem, a means to make a coupling agent into a water dispersible form by its joint use with a surface active agent has been disclosed, for example, in Ken-React Reference Manual (1985) published by Kenrich Petrochemicals Inc., and Japanese Patent Application Laying-Open (Kokai) No. Hei 04-25568. However, the surface active agents described in these references when mixed with a titanium base or the like coupling agent and preserved, react with the coupling agent with the lapse of time, hence entailing a considerable decrease in emulsification capacity of the agent with water. In consequence, such a means results in a problem with regard to the preservation stability when a one-pack type coupling agent is made by blending a coupling agent with a surface active agent in advance.

SUMMARY OF THE INVENTION

An object of the present invention is to develop a one-pack type agent for use in the surface treatment of fillers, which can perform water repellent treatment in water of the surface of fillers and has an excellent preservation stability.

The inventors of the present invention have conducted intensive studies with the aim of achieving the above object and found that surface treatment of fillers can be carried out in water through easy dispersion of a zirconate base or an aluminate base coupling agent when mixed with a nonionic surface active agent which corresponds to the polarity of the side chains of the coupling agent used, that time-wise decrease in emulsifying capacity can be prevented when a nonionic surface active agent which does not contain any protonic hydrogen in its structure is used as the nonionic surface active agent, and that a coupling agent having a high viscosity when used jointly with a water insoluble solvent can provide a high performance. The present invention has been accomplished on the basis of these findings.

Thus, the present invention relates to a surface modifying agent for use in the surface treatment of fillers in water which comprises 100 parts by weight of a zirconate base or/and aluminate base coupling agent(s) whose unhydrolyzable side chains have a solubility parameter ($x$) of 6.5–12, and 3 to 30 parts by weight of a nonionic surface active agent blended therewith having an HLB value ($y$) of 2–30 and containing no protonic hydrogen(s) in its molecule, wherein $x$ and $y$ satisfy a relationship of $4x-24 \leq y \leq 4x-18$, to another surface modifying agent for use in the surface treatment of fillers in water which comprises a mixture of 100 parts by weight of a zirconate base or/and aluminate base coupling agent(s) having a viscosity of 200 cps or more with 30–3000 parts by weight of a water-insoluble solvent, where the total mol fraction value ($z$) of the solubility parameters of the unhydrolyzable side chains of the coupling agent(s) and the solvent is 6.5–12, and 3 to 1000 parts by weight of a nonionic surface active agent blended therewith having an HLB value ($y$) of 2–30 and containing no protonic hydrogen(s) in its molecule, wherein $z$ and $y$ satisfy a relationship of $4z-24 \leq y \leq 4z-18$, and also to fillers which are surface-treated with one or more of these surface treating agents.

DETAILED DESCRIPTION OF THE INVENTION

The unhydrolyzable side chains of a zirconate base or aluminate base coupling agent to be used in the present invention are side chains other than hydrolysis-sensitive functional groups such as an alkoxyl having 4 or less carbon atoms, glycolic acid residue, ethylene glycol residue and the like which are considered released when the coupling agent is linked to a filler. These unhydrolyzable side chains are a moiety which directly takes part in the regulation of wettability with the organic matrix of a resin or the like. Examples of these side chains include carboxylic acid residues such as octanoyl, isostearoyl and the like, sulfonic acid residues such as octylbenzenesulfonyl, dodecylbenzenesulfonyl and the like, pyrophosphoric acid ester residues such as dioctyl pyrophosphate and the like, phosphoric acid ester residues such as dioctyl phosphate and the like, alkoxyl groups such as 2,2-diallyloxymethyl-1-butyloctyl and the like, phosphorous acid ester residues such as dioctyl phosphite, ditridecyl phosphite and the like, phenol residues such as cumylphenyl and the like and alkyl acetoacetates.

Solubility parameter of these side chains should be preferably within 6.5-12 from the view point of the dispersibility of the surface treating agent in water. Though it is difficult to obtain this parameter by experiments, it can be obtained by calculation. That is, this parameter is calculated in accordance with the procedure of P.A. Small disclosed in *J. Appl. Chem.*, 3, 71 (1953). In the case of the calculated value of side chains, the specific gravity of the coupling agent itself is used in the calculation, because the specific gravity of the side chains cannot be obtained.

The zirconate base or aluminate base coupling agent to be used in the present invention is not particularly limited in chemical structure, and can be either a monomer type or a polymer type. Examples of the monomer type include neoalkoxytrisneodecanoyl zirconate, neoalkoxytris (dodecyl) benzenesulfonyl zirconate, neoalkoxytris (dioctyl) phosphate zirconate, neoalkoxytris (dioctyl) pyrophosphate zirconate, neoalkoxytris (ethylenediamino) ethyl zirconate, neoalkoxytris (m-amino)phenyl zirconate, acetoalkoxyaluminium diisopropylate and the like. Examples of the polymer type include cyclic type compounds disclosed in Japanese Patent Application Laying-Open (Kokai) No. Sho 64-52786, straight chain type compounds disclosed in Japanese Patent Application Laying-Open (Kokai) No. Hei 01-108277, and ladder type compounds disclosed in Japanese Patent Application Laying-Open (Kokai) No. Hei 01-129031.

The surface active agent to be used in the present invention is limited to a nonionic surface active agent which does not contain any protonic hydrogen(s) in its molecule, because the use of a surface active agent other than the above-specified one causes a reaction in the presence of, and with, a coupling agent and results in the reduction of the emulsifying capacity with the lapse of time. Examples of the nonionic surface active agents include those represented by any one of the following general formulae (I)–(V), such as polyoxyalkylene alkyl ether carboxylic acid ester, polyoxyalkylene dicarboxylic acid ester, polyoxyalkylene dialkyl ether, polyoxyethyleneglyceryl carboxylic acid ester, polyoxyethyleneglyceryl alkyl ether and the like. Also useful are a hybrid type compound such as a polyoxyalkyleneglyceryl in which both alkyl-etherification and esterification have been formed in one molecule, a saccharide such as sorbitol or the like or a polyoxyalkylene-added product thereof in which all protonic hydrogens in the molecule are alkyl-esterified and/or etherified, and commonly available nonionic surface active agents in which all protonic hydrogens in the molecule are alkyl-esterified and/or etherified. In the following general formulae, n, m and p are independently an integer of 1-30, a, b and c are independently an integer of 1-30, and X, Y and Z are independently a covalent single bond or a phenylene $C_6H_4$.

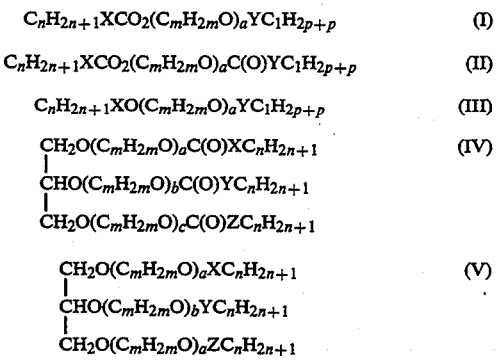

The surface active agent to be used in the present invention should have an HLB value y of preferably within 2-30, from the view point of the dispersibility of the surface treating agent in water. At the same time, when the solubility parameter of a zirconate base and/or aluminate base coupling agent is defined as x, the value y should satisfy a relationship of $4x-24 \leq y \leq 4x-18$. Larger or smaller values than this range entail inferior dispersibility in water. The parameter x is 7-14 in the case of commonly used zirconate base or aluminate base coupling agents, and many of these agents dissolve in water when the value is 12 or more. In addition, these zirconate base and aluminate base coupling agents can be used in combination, and the surface active agent is added in an amount of 3-30 parts by weight based on 100 parts by weight of the jointly used coupling agents. Amounts of the surface active agent if smaller than this range would result in decreased dispersibility, and if larger than this range would hinder the coupling agent in giving water repellency to fillers.

A zirconate base or an aluminate base coupling agent having a viscosity of 200 cps or more is hardly dispersible in water even in the presence of a surface active agent, but becomes easily dispersible when a low viscosity solvent is added. Such type of coupling agents are not particularly limited provided that they are zirconate base or aluminate base coupling agents, and include neoalkoxytrineodecanoyl zirconate, acetoalkoxyaluminium diisopropylate and the like. Also in this case, the use of a protonic hydrogen-containing surface active agent or an ionic surface active agent will cause sharp decline in the emulsifying capacity with the lapse of time.

The water insoluble solvent to be used in the present invention is not particularly limited in so far as it has a solubility of 25% or less, preferably 10% or less, in water at 20° C. and examples of this type of solvents include aromatic solvents such as toluene, xylene and the like, hydrocarbon solvents such as hexane, octane and the like, esters such as ethyl acetate, butyl acetate and the like and ethers such as ethyl ether and the like.

The solvent should be used in an amount of preferably 30-3000 parts by weight based on 100 parts by weight of the total coupling agent(s). Amounts of the solvent if smaller than this range would bear no effective dispersion due to too small decrease in viscosity, and if larger than this range would entail small treatment effects.

In the case of the solvent-blended system, HLB of the surface active agent to be added should be interpreted in the same manner as described in the foregoing and is determined based on the solubility parameter of the solution as a whole. Illustratively saying, when the total mol fraction value of the solubility parameters of the zirconate base or/and aluminate base coupling agent(s) and the solvent is defined as z, and HLB value of the surface active agent is defined as y, these values have a relationship of $4z-24 \leq y \leq 4z-18$.

Also in this case, preferably 3-1000 parts by weight of the surface active agent is blended with 100 parts by weight of the total of the coupling agent(s), or, in other words, about 3-30 parts by weight per 100 parts by weight of the total of both the coupling agent(s) and the solvent. Amounts of the surface active agent if smaller than this range would result in poor dispersibility, and if larger than this range would hinder water repellency-giving effect of the coupling agent.

In this instance, the coupling agent, the solvent and the surface active agent may be mixed in any order and every resulting mixture is included within the scope of the surface treating agents of the present invention, in so far as their amounts in the final mixture are 100 parts by weight, 30-3000 parts by weight and 3-1000 parts by weight, respectively. This is because a mixture of the coupling agent and the solvent has been formed in the site (in situ) in such a three component mixture in the meaning of the present invention.

Treatment of fillers in water with a surface modifying agent of the present invention may be effected by any commonly known water treatment method with no particular limitation, for example by the following procedure; Water, a filler and a surface modifying agent of the present invention are mixed and stirred at room temperature for 10–30 minutes. In this instance, the adding order of water, the filler and the surface modifying agent is not particularly limited. Next, the resulting mixture, as it is or after filtration, is dried to make it into a treated powder (surface-treated filler). The surface modifying agent is used in an amount of 0.05-20% by weight, preferably 0.1-10 parts by weight, per 100 parts by weight of filler. The amount of water is not particularly limited except that it is used in such an amount that the slurry becomes fluid as a whole.

Fillers to be surface-treated with the surface modifying agent of the present invention are not particularly limited, which include for example: rare earth metal base magnetic powders such as of samarium-cobalt, neodymium-iron-cobalt, zirconium-cobalt and the like; ferritic magnetic powders such as of $MO.Fe_2O_3$ (M is one or more metals selected from Ba, Sr, Ca, Mg, Zn and Pb) and the like; metals such as iron, zinc, copper, silver, nickel, tungsten, molybdenum, rhenium, niobium, tantalum, lead and the like; metal oxides such as tungsten trioxide, aluminium oxide, lanthanum oxide, cadmium oxide, chromium oxide, yttrium oxide, titanium oxide, copper oxide, cuprous oxide, lead suboxide, zinc oxide, gadolinium oxide, iron sesquioxide, tri-iron tetroxide, gamma ferric oxide and the like; metal carbonates such as lead carbonate, strontium carbonate, calcium carbonate, barium carbonate and the like; metal hydroxides such as aluminium hydroxide, magnesium hydroxide, chromium hydroxide, nickel hydroxide and the like; as well as pigments such as chromium-lead, iron blue, ultramarine blue, cobalt blue, chromium phosphate, zinc phosphate, lead cyanamide, calcium plumbate, basic silicochromate, carbon pigment, chrome yellow, cadmium yellow, zinc yellow, naples yellow, rhodamine, benzidine yellow and the like; and inorganic fillers such as talc, kaolin, silica, bentonite, glass, tungsten carbide, ammonium parawolframate, asbestos, silicon carbide, acetylene black, black lead, carbon black, barium titanate, cadmium sulfide, barium sulfate, carbon fluoride, black lead fluoride, granulated ammonium chloride, litharge, titanic acid-zirconic acid salt, ammonium dihydrogenphosphate and the like. It can also be applied with no inconvenience to organic pigments such as phthalocyanine blue, Hansa Yellow, lithol red, phthalocyanine green, quinacridone red, aniline black and the like and organic fillers such as ethylenediamine tartarate and the like.

These fillers are not particularly limited in their shape which, therefore, may be not only in the powder or pulverulent form but also in the rod, plate, filamentous, block, flocculent, hollow or the like form.

There is no particular limitation with regard to resins to be filled with the filler thus treated with a surface modifying agent of the present invention, and examples of applicable resins include polyolefins such as polyethylene, polypropylene and the like, chlorinated polyolefins such as chlorinated polyethylene and the like, rubbers such as natural rubber, ethylene-propylene copolymer rubber, butyl rubber, butadiene rubber, isoprene rubber, nitrile rubber, chloroprene rubber and the like, polyamides such as nylon 12, nylon 46, nylon 11, nylon 6, nylon 66 and the like, and PPS, unsaturated polyesters, ethylene-vinyl acetate copolymers, styrene-acryl copolymers, polyesters, epoxy resins and the like.

In addition, the surface modifying agent of the present invention can be applied as a primer to metals and coat films.

The surface modifying agent of the present invention for use in the surface treatment of fillers in water can perform water repellent treatment of fillers in water, and the thus treated fillers can exhibit not only water repellency but also decreased oil adsorption, decreased viscosity in resin, increased filling capacity in resin and the like.

EXAMPLES

The following examples are provided to further illustrate the present invention. It is to be understood, however, that the examples are for the purpose of illustration only and are not to be construed to limit the scope of the invention.

Inventive Example 1

Five parts by weight of stearic acid polyoxyethylenelauryl ether ("Emulex LWS-15", HLB=9 manufactured by Nippon Emulsion Co.) was added as the surface active agent to 95 parts by weight of a zirconate base coupling agent ("LZ01"; solubility parameter of the side chains, about 8; manufactured by Kenrich Petrochemicals, Inc.), and the mixture was stirred at room temperature for 10 minutes to prepare a filler surface modifying agent.

This was heated at 100° C. for 12 hours to perform an accelerated preservation stability test. A 0.1 g portion of the modifying agent after its acceleration test was mixed with 40 ml of water to judge the emulsifying condition by the naked eye. The resulting emulsion was mixed with 10 g of heavy calcium carbonate (average particle size, 6 μm; manufactured by Sankyo Seifun Co.), the mixture was stirred at room temperature for 10 minutes and then filtered, and the remaining material was dried at 85° C. for 1 hour under a reduced pressure to obtain a treated powder.

A 0.2 g portion of the thus treated powder (surface-treated powder) was subjected to molding (200 kg/cm$^2$) using an IR tablet making machine, and one drop of water was put on the thus molded tablet to immediately measure the contact angle using an automatic contact angle analyzer. For the sake of comparison, the same tests were carried out using the treating agent before its acceleration test. The results are shown in Table 1.

Comparative Example 1

Emulsifying capacity in water was observed and the contact angle was measured in the same manner as described in Inventive Example 1 except that polyoxyethylenesorbitan monooleate (HLB=14) was used as the surface active agent. The results are shown in Table 1.

Inventive Example 2

To 95 parts by weight of a zirconate base coupling agent ("LZ38"; solubility parameter of the side chains, about 9.1; manufactured by Kenrich Petrochemicals, Inc.) were added 95 parts by weight of toluene (solubility parameter, 8.9) and 10 parts by weight of polyoxyethyleneglyceryl triisostearate ("Emulex GWIS-360", HLB=14 manufactured by Nippon Emulsion) as the surface active agent to prepare a surface modifying agent.

Using the thus prepared modifying agent, heavy calcium carbonate treatment was carried out, emulsifying capacity in water was observed and the contact angle was measured in the same manner as described in Inventive Example 1. The results are shown in Table 1.

Comparative Example 2

A treating agent was prepared by adding 5 parts by weight of polyoxyethylene octylphenyl ether ("Emulex OP-15", HLB=14, manufactured by Nippon Emulsion Co.) as the surface active agent. Emulsifying capacity in water was observed and the contact angle was measured in the same manner as described in Inventive Example 2 except that the just described treating agent was used. The results are shown in Table 1.

Comparative Example 3

Emulsifying capacity in water was observed and the contact angle was measured in the same manner as described in Inventive Example 2 except that polyoxyethylenesorbitan monooleate (HLB= 14) was used as the surface active agent. The results are shown in Table 1.

Inventive Example 3

Emulsifying capacity in water was observed and the contact angle was measured in the same manner as described in Inventive Example 1 except that an aluminium base coupling agent ("Algomer S"; solubility parameter of the side chains, about 8; manufactured by Kawaken Fine Chemicals Co., Ltd.) was used as the coupling agent. The results are shown in Table 1.

Comparative Example 4

Emulsifying capacity in water was observed and the contact angle was measured in the same manner as described in Inventive Example 3 except that polyoxyethylenesorbitan monooleate (HLB=14) was used as the surface active agent. The results are shown in Table 1.

Inventive Example 4

To 95 parts by weight of an aluminate base coupling agent ("ALM"; solubility parameter of the side chains, about 8.5; manufactured by Ajinomoto Co., Inc.) were added 95 parts by weight of toluene (solubility parameter, 8.9) and 10 parts by weight of polyoxyethyleneglyceryl triisostearate ("Emulex GWIS-360", HLB=14, manufactured by Nippon Emulsion Co) as the surface active agent to prepare a surface treating agent. Using the thus prepared modifying agent, heavy calcium carbonate treatment was carried out, emulsifying capacity in water was observed and the contact angle was measured in the same manner as described in Inventive Example 1. The results are shown in Table 1.

Comparative Example 5

A surface modifying agent was prepared by using 5 parts by weight of polyoxyethylene octylphenyl ether ("Emulex OP-15", HLB =14, manufactured by Nippon Emulsion Co.) as the surface active agent. Emulsifying capacity in water was observed and the contact angle was measured in the same manner as described in Inventive Example 4 except that the just described treating agent was used. The results are shown in Table 1.

Comparative Example 6

Emulsifying capacity in water was observed and the contact angle was measured in the same manner as described in Inventive Example 4 except that polyoxyethylenesorbitan monooleate (HLB=14) was used as the surface active agent. The results are shown in Table 1.

TABLE 1

| Surface modifying agent | Emulsifying capacity and contact angle of treated CaCO$_3$ against water | | | |
|---|---|---|---|---|
| | Emulsification in water | | Contact angle of treated CaCO$_3$ | |
| | before acceleration test | after acceleration test | before acceleration test | after acceleration test |
| Inventive Example | | | | |
| 1 | ◯ | ◯ | 104° | 104° |
| 2 | ◯ | ◯ | 112° | 110° |
| 3 | ◯ | ◯ | 110° | 108° |
| 4 | ◯ | ◯ | 103° | 101° |
| Comparative Example | | | | |
| 1 | ◯ | X | 105° | 60° |
| 2 | ◯ | X | 90° | 64° |
| 3 | ◯ | X | 101° | 62° |
| 4 | ◯ | X | 108° | 55° |
| 5 | ◯ | X | 93° | 68° |
| 6 | ◯ | X | 90° | 66° |

Inventive Example 5

(1) Surface modifying agents tested:

(a) To 95 parts by weight of a zirconate base coupling agent ("LZ38"; solubility parameter of the side chains, about 9.1; manufactured by Kenrich Petrochemicals, Inc.) were added 95 parts by weight of toluene and 10 parts by weight of polyoxyethyleneglyceryl triisostearate ("Emulex GWIS-360", manufactured by Nippon Emulsion Co.), followed by mixing to prepare a surface modifying agent Z.

(b) To 95 parts by weight of an aluminate base coupling agent ("AL-M"; solubility parameter of the side chains, about 8.5; manufactured by Ajinomoto Co., Inc.) were added 95 parts by weight of toluene (solubility parameter, 8.9) and 10 parts by weight of polyoxyethyleneglyceryl triisostearate ("Emulex GWIS-360"; HLB=14; manufactured by Nippon Emulsion Co.), followed by mixing to prepare a surface modifying agent A.

(c) For the sake of comparison, 5 parts by weight of polyoxyethyleneglyceryl triisostearate ("Emulex GWIS-360"; HLB=9; manufactured by Nippon Emulsion Co.) was added to 95 parts by weight of a titanate base coupling agent ("KR 46B"; solubility parameter of the side chains, about 8; manufactured by Ajinomoto Co., Ltd.), and the mixture was stirred at room temperature for 10 minutes to prepare a surface modifying agent T.

(2) Experiments:

Experiment 1: Treatment of carbon black 40 ml of water and 1.0 g of the surface modifying agent T described above were added to 10 g of carbon black ("#52", manufactured by Mitsubishi Kasei Corp.), and the mixture was stirred at room temperature for 10 minutes, followed by filtration under a reduced pressure. The resulting residue was dried at 120° C. for 3 hours under a reduced pressure to obtain a treated powder preparation C-T (surface modified carbon black). Also, a treated powder preparation C-A was obtained in the same manner except for the use of the treating agent A.

When 0.1 g of each of these treated powder preparations was dispersed in 20 ml of toluene, C-T precipitated after about 1 hour, while C-A showed stable dispersion even after 1 day of standing.

Experiment 2: Treatment of titanium dioxide 40 ml of water and 0.2 g of the surface modifying agent T described above were added to 10 g of titanium dioxide ("Rutile Type", manufactured by Junsei Kagaku Co.), and the mixture was stirred at room temperature for 10 minutes, followed by filtration under a reduced pressure. The resulting residue was dried at 120° C. for 3 hours under a reduced pressure to obtain a treated powder preparation T-T(surface modified titanium dioxide). Also, a treated powder preparation T-A was obtained using the treating agent A, and a treated powder preparation T-Z using the treating agent Z.

When whiteness (L value) of each of these treated powder preparations was measured, the value was 90 in the case of the treated powder T-T, 95 in the treated powder T-A and 96 in T-Z. T-T was yellow even to the naked eye.

(3) Conclusion:

In comparison with a titanate base coupling agent, a filler surface modifying agent in which an aluminate base or a zirconate base coupling agent is formulated does not spoil color tone of pigments. Also, an aluminate base-formulated surface modifying agent is suitable for use in the treatment of carbon black. As a whole, it is evident that a filler surface modifying agent in which an aluminate base or zirconate base coupling agent is formulated is superior to a titanate base coupling agent-formulated surface modifying agent.

(Effects of the Invention)

The present invention has rendered possible easy provision of a filler surface modifying agent which can perform water repellent treatment of fillers in water and has an excellent preservation stability.

What is claimed is:

1. A surface modifying agent for surface treating a filler in water which comprises 100 parts by weight of a zirconate base or/and aluminate base coupling agent (s) whose unhydrolyzable side chains have a solubility parameter (x) of 6.5-12, and 3 to 30 parts by weight of a nonionic surface active agent blended therewith having an HLB value (y) of 2-30 and containing no protonic hydrogen(s) in its molecule, wherein x and y satisfy a relationship of $4x-24 \leq y \leq 4x-18$.

2. A surface modifying agent for surface treating a filler in water which comprises a mixture of 100 parts by weight of a zirconate base or/and aluminate base coupling agent (s) having a viscosity of 200 cps or more with 30-3000 parts by weight of a water-insoluble solvent, where the total mol fraction value (z) of the solubility parameters of the unhydrolyzable side chains of the coupling agent(s) and the solvent is 6.5-12, and 3 to 1000 parts by weight of a nonionic surface active agent blended therewith having an HLB value (y) of 2-30 and containing no protonic hydrogen(s) in its molecule, wherein z and y satisfy a relationship of $4z-24 \leq y \leq 4z-18$.

3. The surface modifying agent for surface treating a filler in water according to claim 1 or 2 wherein said nonionic surface active agent is at least one of the compounds represented by the following general formulae (I) to (V):

$$C_nH_{2n+1}XCO_2(C_mH_{2m}O)_aYC_pH_{2p+1} \qquad (I)$$

$$C_nH_{2n+1}XCO_2(C_mH_{2m}O)_aC(O)YC_pH_{2p+1} \qquad (II)$$

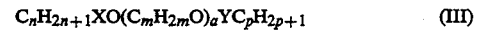
$$C_nH_{2n+1}XO(C_mH_{2m}O)_aYC_pH_{2p+1} \qquad (III)$$

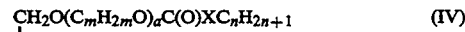
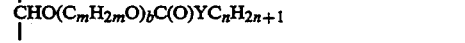
$$\begin{array}{l}CH_2O(C_mH_{2m}O)_aC(O)XC_nH_{2n+1}\\|\\CHO(C_mH_{2m}O)_bC(O)YC_nH_{2n+1}\\|\\CH_2O(C_mH_{2m}O)_cC(O)ZC_nH_{2n+1}\end{array} \qquad (IV)$$

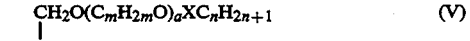
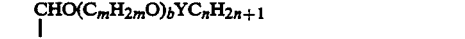
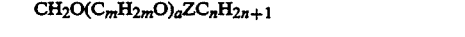
$$\begin{array}{l}CH_2O(C_mH_{2m}O)_aXC_nH_{2n+1}\\|\\CHO(C_mH_{2m}O)_bYC_nH_{2n+1}\\|\\CH_2O(C_mH_{2m}O)_aZC_nH_{2n+1}\end{array} \qquad (V)$$

wherein, in the above general formulae, each of n, m and p is independently an integer of 1-30, each of a, b and c is independently an integer of 1-30, and each of X, Y and Z is independently a covalent single bond or a phenylene $C_6H_4$.

4. A filler which has been surface-treated with 0.05-20% by weight (per filler) of the filler surface modifying agent of any one of Claims 1-2, said filler being selected from the group consisting of rare earth metal base magnetic powders, ferritic magnetic powders, metals, metal oxides, metal carbonates, metal hydroxides, inorganic pigments, carbon black, and organic pigments.

* * * * *